E. V. PARKER.
VALVE CONTROL MECHANISM FOR INTERNAL COMBUSTION ENGINES.
APPLICATION FILED MAR. 30, 1920.

1,410,263.

Patented Mar. 21, 1922.

INVENTOR.
ERNEST V. PARKER
BY
Richard J. Cook
ATTORNEYS.

E. V. PARKER.
VALVE CONTROL MECHANISM FOR INTERNAL COMBUSTION ENGINES.
APPLICATION FILED MAR. 30, 1920.
1,410,263.
Patented Mar. 21, 1922.
5 SHEETS—SHEET 3.
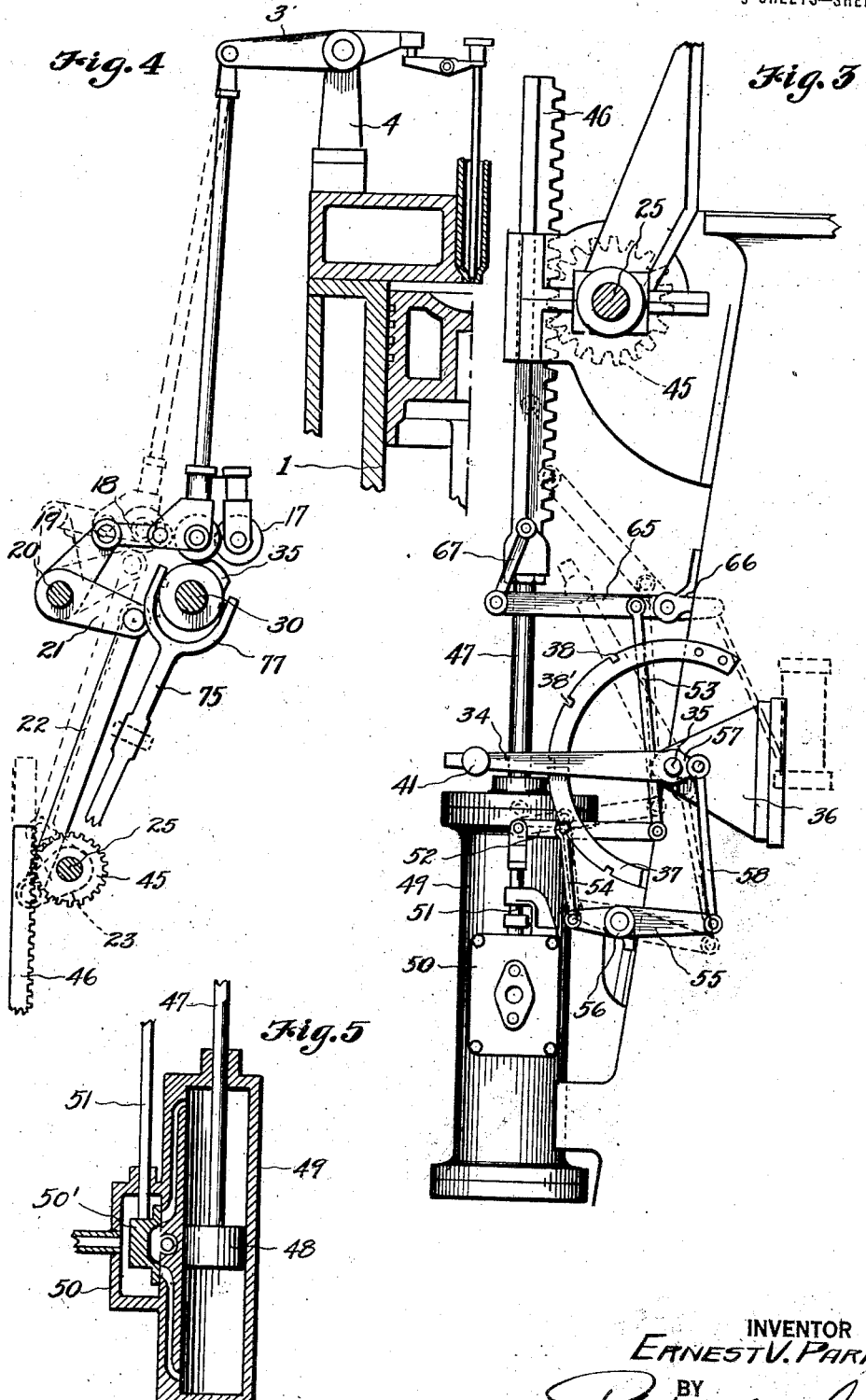
INVENTOR
ERNEST V. PARKER
BY
Richard J. Cook
ATTORNEY E. V. PARKER.
VALVE CONTROL MECHANISM FOR INTERNAL COMBUSTION ENGINES.
APPLICATION FILED MAR. 30, 1920.
1,410,263.
Patented Mar. 21, 1922.
5 SHEETS—SHEET 4.
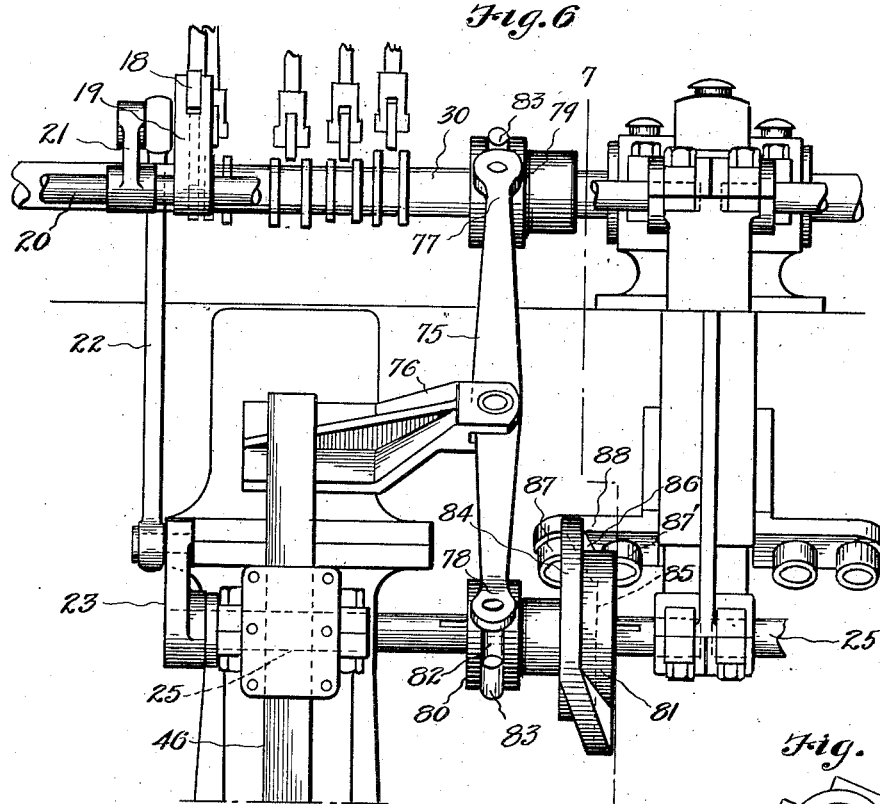
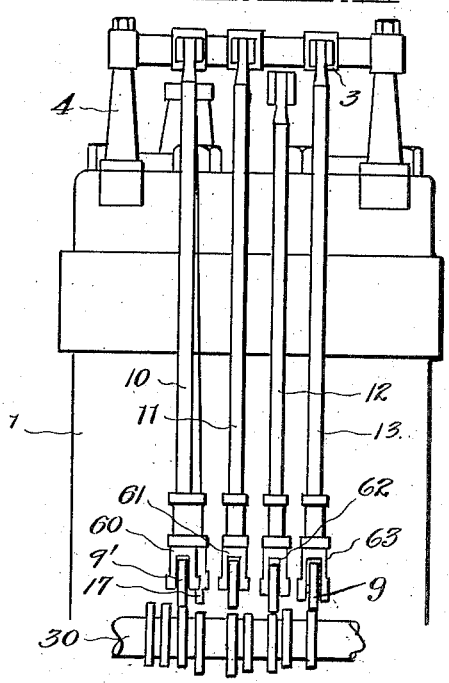
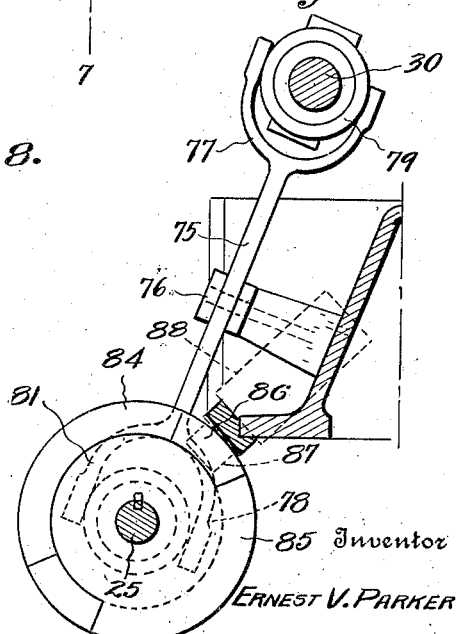
Inventor
Ernest V. Parker
By
Richard J. Cook
Attorney E. V. PARKER.
VALVE CONTROL MECHANISM FOR INTERNAL COMBUSTION ENGINES.
APPLICATION FILED MAR. 30, 1920.
1,410,263. Patented Mar. 21, 1922.
5 SHEETS—SHEET 5.
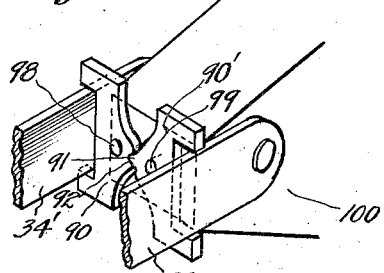
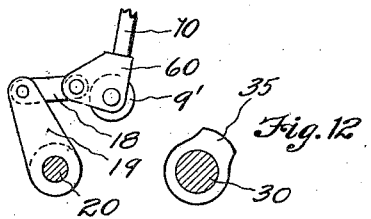
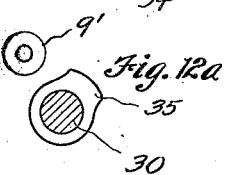
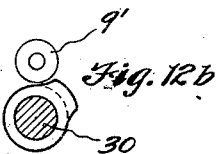
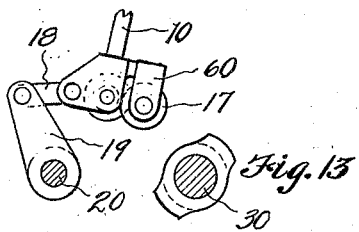
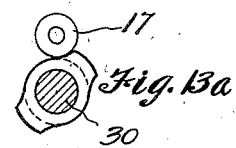
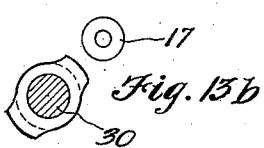
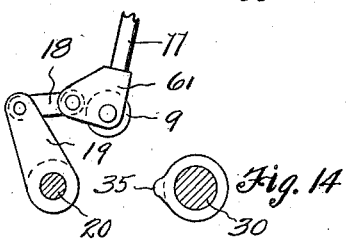
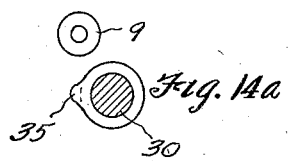
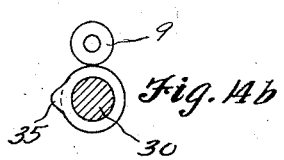
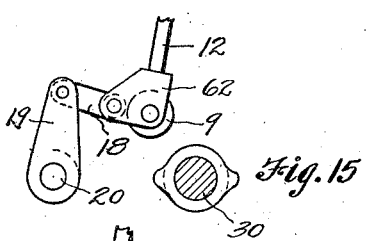
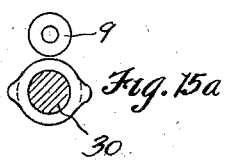
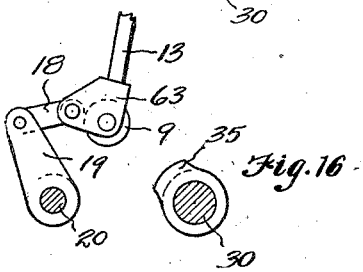
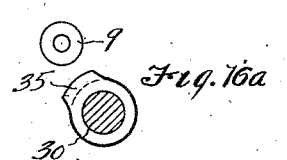
INVENTOR
ERNEST V. PARKER
BY
Richard J. Cook
ATTORNEY

UNITED STATES PATENT OFFICE.

ERNEST V. PARKER, OF TACOMA, WASHINGTON.

VALVE-CONTROL MECHANISM FOR INTERNAL-COMBUSTION ENGINES.

1,410,263.   Specification of Letters Patent.   Patented Mar. 21, 1922.

Application filed March 30, 1920. Serial No. 369,966.

*To all whom it may concern:*

Be it known that I, ERNEST V. PARKER, a citizen of the United States, and resident of the city of Tacoma, county of Pierce, and State of Washington, have invented certain new and useful Improvements in Valve-Control Mechanism for Internal-Combustion Engines, of which the following is a specification.

This invention relates to improvements in internal combustion engines, and more particularly to those of that class known as Diesel engines, and which are of a type that employ air under pressure for starting.

The principal object of the present invention is to provide simplified mechanism for engines of this character, particularly marine engines, which operates automatically upon the shifting of a control lever from a neutral to different positions, to start and drive the engine in a forward or reverse direction, accordingly as the lever is shifted, that is, a mechanism for controlling the maneuvering of an engine, which operates under the control of a pivotally mounted lever, movable in opposite directions from a neutral position, and which, upon an initial and subsequent movement in either direction, causes the automatic adjustment of valve operating and control parts which admit and exhaust the air and fuel charges to the engine cylinders in a manner that will first start, and then drive the engine in the direction determined by the direction of shifting of the lever.

It is also an object of the invention to provide an engine maneuvering mechanism, embodying two separate control levers, which control the operation of the forward and after cylinders of the engine and which are movable independently of each other to start or drive their part of the engine but which have a certain interlocking connection which will prevent their movement except in proper sequence.

It is a further object of the invention to provide mechanism of the above described character adapted to engines working on the four-stroke cycle principle yet starting by means of compressed air on the two stroke cycle.

Since engines for which the present control mechanism is intended comprises fuel injection, air supply, exhaust and starting air valves and have separate actuating heads for each valve, it is an object of the invention also to provide as a part of the control mechanism, means for shifting the heads between neutral and operative positions, and means whereby a rotative cam shaft having cams thereon for operating said heads may be shifted longitudinally so that said cams will actuate the heads in proper sequence for starting and driving the engine in either direction.

In accomplishing these and other objects of the invention, I have provided the improved details of construction, the preferred forms of which are illustrated in the accompanying drawings, wherein—

Figure 3 is an enlarged view, showing the control lever, a cataract brake mechanism operated by said lever and which controls the movement of a valve for operating an air ram, and the rack actuated by the ram for revolving the reversing shaft and shifting the cam shaft.

Figure 4 is a side view, illustrating the mechanism for moving the push rod heads transversely into and from functional relation with the cams of the cam shaft.

Figure 5 is a detail sectional view of the ram and its controlling valve.

Figure 6 is a front elevation, particularly illustrating the mechanism which shifts the cam shaft.

Figure 7 is a sectional view taken on the line 7—7 of Figure 6.

Figure 8 is a front elevation of an engine cylinder, together with its valve operating mechanism.

Figure 11 is a detail perspective view of the locking dogs associated with the control levers.

Figures 12, 12$^a$ and 12$^b$ are cross sectional views through the valve actuating cam shaft, illustrating the shape of the cam for actuating the natural exhaust valve, and the relation thereto of the cam roller engaged thereby, respectively in neutral, starting and running positions.

Figures 13, 13$^a$ and 13$^b$ are similar views of the cam for actuating the starting air exhaust valve, and its roller restively in neutral, starting and running positions.

Figures 14, 14<sup>a</sup> and 14<sup>b</sup> are similar views of the air injection valve cam and its roller.

Figures 15, 15<sup>a</sup> and 15<sup>b</sup> are similar views of the starting air valve cam and its roller.

Figures 16, 16<sup>a</sup> and 16<sup>b</sup> are similar views of the air suction valve cam and its roller.

In engines of the type referred to, it is customary to employ air, which has been previously compressed and stored in a tank, as the means for starting the operation of the engine. This manner of operation, however, is cut off as soon as the engine has been started and, in fact, the mechanism necessary for the use of air in starting may, when the engine is one having several cylinders, be applied to a portion only of the cylinders.

Figure 1:
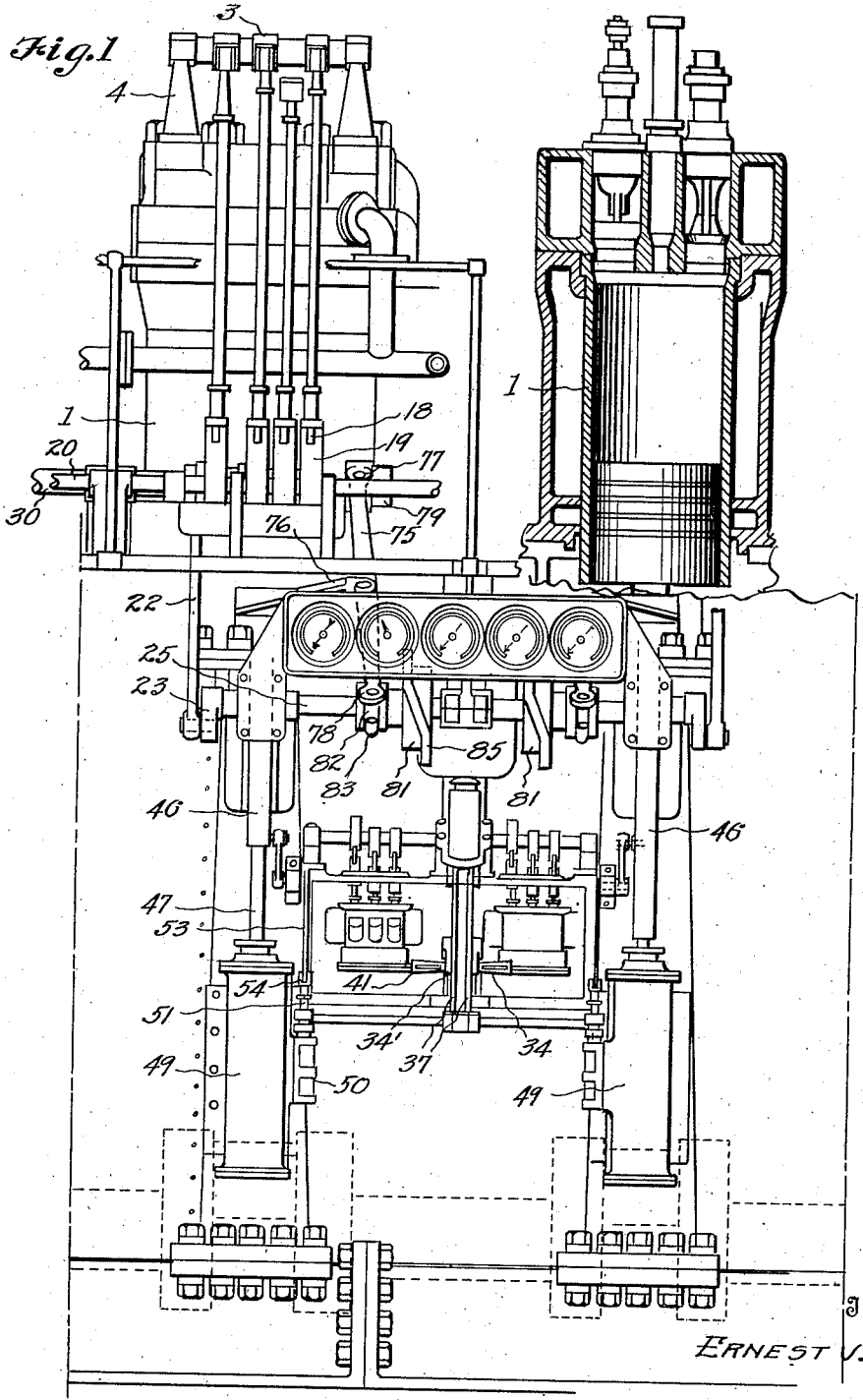
Figure 1 is a front elevation of an engine equipped with control mechanism embodying the present invention.

While the particular construction of the cylinders of the engine, their pistons, and of the control valves, is immaterial to the operation of the present mechanism, I have shown these parts in a construction which I prefer, but which is, however, intended to represent any type of construction which may utilize these parts. I have also shown, in Figure 1, two engine cylinders which are separately controlled by levers which are independently operable but which may not be moved except in proper sequence. The mechanism operating in conjunction with these levers and the control valves of the cylinders is, however, identical and the greater part of the following description will be confined to one set only, with the understanding that it relates equally to both sets.

Referring more in detail to the drawings. In the present construction each cylinder 1 employs a series of valves, the number depending to a certain extent upon other features, and which are operated through the medium of levers 3 pivotally supported in any suitable manner, as upon brackets 4, and these levers are in turn operated through the intermediacy of links or push rods. The number of levers 3 and push rods employed depends upon the number of valves which are required for any particular cylinder.

In the construction shown, the above mentioned push rods depend along the front of the cylinder and are moved lengthwise under the normal action of operating the valves and are independent of each other in their movement in this direction. They are, however, connected in such a manner that they move together transversely of their length in order that they may be adjusted for operating under different conditions, for instance, while running, while standing and while starting, for each of these purposes they occupy a different position transversely of their length.

At their lower ends, each of the push rods has a head secured thereto and these heads have either one or two cam rollers mounted therein; the number varying with the different heads. In Figure 8, wherein all of the rods of the cylinder at the left are shown, I have indicated the individual rods by the reference characters 10, 11, 12 and 13; the rod 10 is the one used to control the exhaust valve, the rod 11 is used to control the fuel injection, 12 controls the starting air, and 13 controls the air suction which provides the air charge for the engine cylinders. The heads, at the lower ends of the push rods, are in Figure 8, differentiated from the different rods by the reference characters 60, 61, 62 and 63; the heads 61, 62 and 63 being those which control, respectively, the fuel injection, starting air, and the air suction, are each supplied with a single cam roller 9. The head 60, however, has two cam rollers located in different positions transversely of the length of the rod 10; as here shown, it is provided with one roller 9' in alinement with the rod and a second roller 17 rearwardly and at the side thereof.

All of the heads are connected with a common operating mechanism for adjustment in the direction transversely of the length of the rods, consisting of links 18 having ends pivotally connected to the heads and their opposite ends pivotally connected with the swinging ends of arms 19 fixed to a horizontal shaft 20 revolubly mounted in a line parallel to the line of cylinders of the engine.

At one end of the shaft 20 is a crank 21, which, at its outer end, is pivotally connected to a link 22, which in turn, at its opposite end, is likewise pivotally fixed to the outer end of a crank or lever 23 fixed at the end of a shaft 25 revolubly mounted parallel with, but below and forwardly of the shaft 20. It is apparent that by this construction and manner of connection, rotation of the shaft 25 will actuate the crank 23 and link 22 to move the crank 21 and shaft 20 to simultaneously shift all the roller holding heads in a lateral direction.

All of the cam rollers carried by these heads, excepting that carried by the heads which operates the starting air, and one of those carried by the exhaust operating head, are located in alinement, these being the rollers which are shown at the left hand side of the head in Figure 4. The roller which is carried by the head for operating the starting air and the roller 17 of the exhaust operating head are placed in alinement, parallel with the others, but moved to one side thereof. These heads are shown by full lines in the position they would occupy during the normal running operation of the engine. In dotted lines in Figure 4 they are shown in the position they would occupy when the engine is stopped. In an intermediate position, being the position wherein the axis of the roller 17 is alined vertically with the center of a cam shaft 30, the parts are in position for starting the engine by the use of compressed air.

Figure 2:
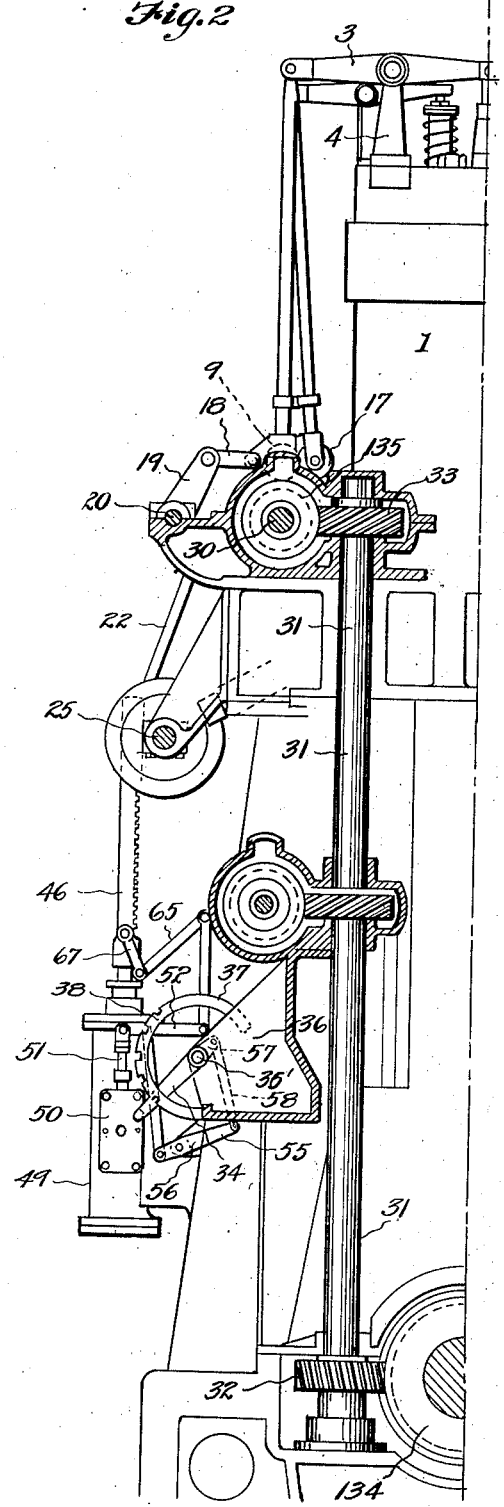
Figure 2 is a vertical sectional view of a part of the engine.

The shaft 30 is revolubly mounted in suitable bearings, provided, and is turned in any suitable manner from the crank shaft of the engine. For a four-cycle engine this shaft would turn at one half the speed of the engine shaft. The preferred manner of connecting these shafts is shown in Figure 2, wherein a vertical shaft 31 is provided at its opposite ends with helical gears 32 and 33, which travel in mesh, respectively, with gear wheels 134 and 135, on the engine shaft and shaft 30.

On the shaft 30 I have provided a series of cams for engagement with the rollers of the valve actuating heads. The cams employed while the engine is running normally have a single lobe, as shown at 35, in Figures 12, 14 and 16. Those employed while the engine is being started under air as shown in Figures 13 and 15 have two lobes placed oppositely, so that these valves are then operated on every revolution of the engine shaft.

As the present engine is one which is adapted to be reversed, I have provided the shaft 30 with duplicate sets of cams, as shown in Figure 8 so that the valves may be operated under different timing for the reversal, which are brought into action by a longitudinal shifting of the shaft 30. In this construction, if the shaft be shifted to the right a distance corresponding with the separation of the corresponding cam of any set, these cams will alternate into position to engage with the cam rollers, and the valves will thus be operated in a manner for turning the engine in opposite directions. The present invention resides chiefly in the mechanism for affecting the shifting of the cam shaft and for moving the valve rods into functional relation with the proper cams for starting, and driving the engine in the forward or reverse direction, and such mechanism as is provided is primarily under the control of a lever 34 that is pivotally mounted on a fixed member, such as the pin 36' located in a bracket 36.

The lever 34 is adapted to move from a neutral, horizontially extending position, in either direction along a quadrant 37 provided at spaced intervals with notches 38 which are adapted to receive a spring pressed locking tooth 39 that is carried by the lever and which serves to lock the same when it is adjusted to these different positions. The tooth may be lifted from locking position by means of a lever 40 mounted on a handle 41 at the outer end of the lever 34 so that the latter lever may be free to be adjusted.

Fixedly mounted on the shaft 25 is a gear wheel 45 and operating in mesh therewith is a rack 46 that is fixed to and moves with a piston rod 47 extending from a piston 48 that operates in an air ram cylinder 49.

This piston is moved in opposite directions by means of air that may be admitted under pressure into opposite ends of the cylinder by the movement of a valve mechanism, as shown at 50, which is controlled by the movement or position of the lever 34.

The mechanism 50 comprises the slide valve 50' which is controlled by what is commonly known as a cataract brake mechanism and which consists of a rod 51 fixed to the valve 50', and at its upper end is pivotally connected to the outer end of lever 52, which in turn is pivotally supported at its inner end from a link 53.

The lever 52 is moved vertically at its outer end to actuate the valve 50', by means of a lift rod 54 connected at its upper end with the lever 52, and at its lower end is pivotally fixed to the outer end of a rocker lever 55 supported intermediate its ends in a bracket 56. A link 58 connects the inner end of the rocker lever 55 with an extension 57 of the lever 34 beyond its pivotal point.

At a point above the control lever 34, is a lever 65, that is supported pivotally at its inner end by means of a bracket 66, secured to the engine frame or body. The outer end of this lever is connected by a link 67 with the lower end of the rack 46 so that the lever 65 moved upwardly and downwardly in accordance with the rack, and the upper end of the link 53 is pivotally attached to the lever 65, so that the inner end of the lever 52 moves upwardly and downwardly accordingly, as does the lever 65.

The construction of the cataract brake mechanism is such that on moving the hand lever 34 through any fraction of its travel, the valve 50' is opened a corresponding amount, causing the piston to move; likewise, as the rack begins to move, the air valve begins to return to its central or closed position, consequently, when the piston has traveled through a fraction of its stroke corresponding with the original movement of the lever 34, the valve is again central and the rack at rest.

Since the rack 46 operates in mesh with a gear wheel 45 that is fixed on the shaft 25, it is apparent that vertical shifting of the gear rack 46 will cause rotation of the shaft, and this in turn will cause a corresponding movement of the crank 23 that is fixed thereto. This, through the link 22 and crank 21, will rotate the shaft 20 to shift the roller carrying heads 6 into or from position where they will be engaged by their operating cams on the shaft 30.

Working in conjunction with this head shifting mechanism, is mechanism for shifting the cam shaft longitudinally so that its different sets of cams may be brought into the different positions required for driving the engine forwardly, or in a reverse direction.

This mechanism consists of a dog lever 75 that is pivotally supported between its ends by means of a bracket 76, mounted on a stationary part of the engine, and provided at its ends with dogs 77 and 78, respectively, enclosing a drum 79 fixed to the shaft 30 and a drum 80 formed as a part of a larger drum 81, that is slidably keyed on the shaft 25.

Each of the drums 79 and 80 is provided with a circumferential groove 82, and the dogs have collars 83 fitted within the grooves so that the drums are free to revolve.

The drum 81 has a cam flange about its circumference comprising two offset segmental portions 84 and 85, which lie in parallel planes, perpendicular to the shaft 30, and these two portions are connected by an inclined portion 86. This cam flange is adapted to move, as the drum is revolved, between two rollers, 87, 87', that are fixed to a bracket 88 mounted on a stationary frame member. When the cam is in neutral position, the inclined portion 86 is positioned between the rollers 87, 87', and when the shaft 25 is revolved to effect the positioning of the roller heads 6 for maneuvering the engine, the drum 81 is also revolved, causing the cam flanges 84 or 85, to move between the rollers and in this manner shift the drum 80 longitudinally on the shaft, to move the lever 75 to shift the cam shaft 30 accordingly, to position the cams properly for the operation of the engine.

While I have described but one control mechanism, it is intended to provide engines with a plurality of cylinders with two separate controls which effect opposite halves of the engine. This is illustrated particularly in Figure 1, where the lever 34 controls the cylinder at the right and the lever 34' controls the operation of the control mechanism at the left; the purpose of this being to make it possible to use but a portion of the engine when all of the cylinders are not required.

It is apparent, however, that it would be disastrous if one part of the engine should be started in one direction while the other part was running in an opposite direction, and I have, therefore, provided mechanism whereby the two control levers are interlocked so that they cannot be moved in any but a proper direction.

Figure 9:
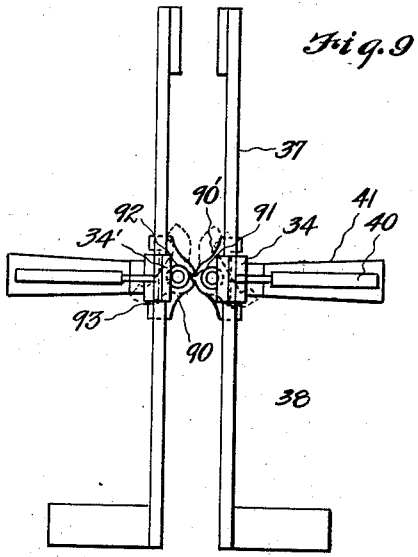
Figure 9 is a detail view illustrating the mounting of the control levers, and their interlocking mechanism to permit their operation only in proper sequence.
Figure 10:
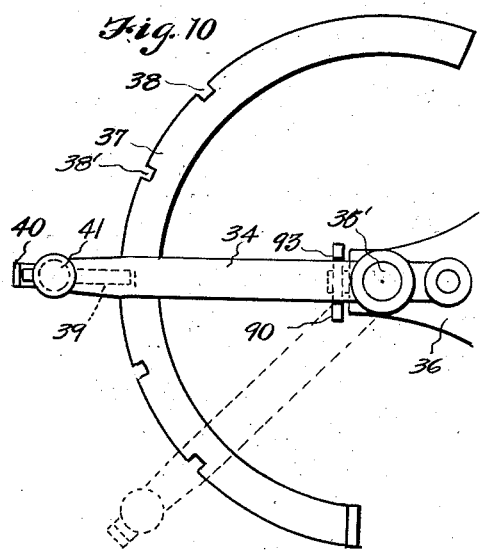
Figure 10 is a side view of the same.

This mechanism consists of a pair of locking dogs 90 and 90' shown in Figures 9, 10 and 11, that are pivotally mounted respectively on pins 98 and 99 extended into a boss or frame member 100 projecting from the engine or cylinder body outwardly to a point between the levers. These two dogs have circularly formed, engaging peripheral surfaces, and extending from the periphery of the dog 90' is a tooth 91 that projects into a cooperating notch 92 correspondingly located in the dog 90 in such manner that the two members have a rolling and locking contact in the manner of two gears. Each dog, on its outer edge, has a notch 93 therein which receive the levers 34 and 34'. Should the lever 34 be moved upwardly, the dog 90 is rotated in a manner that will move the opposite dog in a like manner, as shown in dotted lines in Figure 9. So long as the first lever is moved from a neutral position, the second lever cannot be moved in any but the same direction, due to the fact that movement of a lever in either direction locks the opposite dog against movement to open in an opposite direction.

Assuming that the parts are so constructed and assembled, the operation would be as follows: Assuming that the control lever 34 is in neutral position, as is indicated in Figure 3, and it is desired to start the engine, to operate in a forward direction, the lever 34 is first shifted upwardly so that it locks in the notch 38'. As the lever moves upwardly air is admitted into the air ram which moves the rack 46 upwardly a corresponding or predetermined distance, revolving the shaft 25 and thereby, through the crank 23, link 22, and crank 21, revolves the shaft 20, which simultaneously shifts all of the roller heads 6 from the neutral position, as indicated in dotted lines in Figure 4, into a position where the rollers of the push rods 10 and 12 will be acted upon by the respective cams to admit and exhaust air from the cylinders, after the fashion required for starting.

After the engine is thus started, the lever 34 is advanced into the second notch of the quadrant, which, through the parts just mentioned, shifts the heads 6 farther inward to remove the rollers 17 and 9', from operative contact, and positions the rollers of the heads which govern the fuel injection and exhaust and air suction, in operative contact with the cams.

Simultaneously with the shifting of the heads 6 through the revolving of the shaft 25, the drum 81 on the shaft is revolved to actuate the dog lever 75 to shift the cam shaft 30 longitudinally to position the proper cams in position for operating the engine in a forward direction. When it is desired to stop the engine, the lever 34 is moved to the neutral position, which causes the air ram to operate again to move the roller heads 6 from operating position and shifts the cam shaft so that its cams are out of alinement with any of the rollers.

To reverse the direction of the engine, the control lever would be moved downwardly. This will cause the roller heads to be shifted toward the engine, and the drum 81 to be rotated in a direction that will cause an opposite directional shifting of the shaft 30 to bring a different set of cams into play for effecting the different timing required in the valves for the reverse driving.

It is apparent that by the use of such a device the maneuvering of an engine is placed under the control of one or two levers, which operates mechanism that automatically effects the positioning of the valve heads and the shifting of proper cams into driving relation therewith.

Having thus described my invention, what I claim as new and desire to protect by Letters Patent, is:

1. In an engine of the class described in combination with the valves thereof, separate actuating heads for the different valves, a cam shaft comprising separate sets of cams for operating different heads used in effecting the starting and forward or reverse running of the engine, means for actuating the heads between neutral and running positions and means operable upon movement of the cam shaft to place certain cams in operating position and for shifting certain heads into operating relation therewith.

2. A valve actuating mechanism for internal combustion engines comprising fuel injection, air supply, exhaust and starting air valves, separate actuating heads for each of said valves, a longitudinally shiftable cam shaft provided with cams for actuating said heads to effect starting and driving of the engine in a forward or reverse direction, a rotatably mounted lay shaft, means on the said shaft for actuating the said heads between neutral and operating positions by rotation of the shaft and means operable to simultaneously rotate the lay shaft and to shift the cam shaft longitudinally to move the valve actuating heads between neutral and operative position and bring the proper cams in alinement therewith for starting and driving the engine in either direction.

3. A valve controlling mechanism for internal combustion engines comprising fuel injection, air supply, exhaust and starting air valves, separate actuating heads for each of said valves, a longitudinally shiftable cam shaft having separate sets of cams thereon for actuating the valves at properly timed intervals for forward or reverse running, a rotatably mounted lay shaft, means operable by rotation of the lay shaft for actuating the heads together between neutral and operating positions, a control shaft and means operable in accordance with the direction of rotation of the control shaft for simultaneously actuating the lay shaft to effect positioning of the valve actuating heads in driving relation with the cam shaft and for moving the cam shaft longitudinally to position one of said sets of cams in driving relation with the said heads for starting and driving the engine in a direction as governed by the direction of rotation of the control shaft.

4. A valve controlling mechanism for internal combustion engines comprising fuel injection, air supply, exhaust and starting air valves, separate actuating heads for each of said valves, a longitudinally shiftable cam shaft provided with cams for actuating said heads, a rotatably mounted lay shaft, means on the lay shaft for actuating the heads together between neutral and operating positions, a control shaft, means connecting the control shaft with the lay shaft whereby the latter is rotated by rotation of the former, a drum keyed to the control shaft to move longitudinally thereon, a cam flange on the drum movable between fixed rollers at its opposite sides to effect shifting of the drum longitudinally on the shaft when the latter is revolved, a pivotally mounted lever operatively connected at its opposite ends with the said drum and with the cam shaft in such manner that rotation of the control shaft to actuate the lay shaft to shift the valve actuating heads also rotates and shifts the drum to actuate the lever to shift the cam shaft for the purpose set forth.

5. A valve controlling mechanism for internal combustion engines comprising fuel injection, air supply, exhaust and starting air valves, separate actuating heads for each of the said valves, a longitudinally shiftable cam shaft having separate sets of cams thereon for starting and driving the engine in a forward or reverse direction, a rotatably mounted lay shaft, rocker arms fixed to said shaft, links connecting the ends of said arms and the heads whereby the latter may be shifted together into or from operative relation with the cam shaft by rotation of the lay shaft, a revoluble control shaft, means connecting the lay and control shafts whereby rotation of control shaft rotates the lay shaft, a drum slidably keyed to move longitudinally on the control shaft and having a cam flange formed thereon movable between fixedly mounted rollers at its opposite sides whereby rotation of the control shaft in opposite directions will cause the drum to move from a neutral position in opposite directions according to the direction of rotation of the control shaft, a centrally pivoted lever operatively connected at its opposite ends with the cam shaft and with the said drum whereby shifting of the drum on the control shaft causes longitudinal shifting of the cam shaft, and means for controlling the direction and extent of rotation of the control shaft for the purpose set forth.

6. A valve controlling mechanism for internal combustion engines comprising fuel injection, air supply, exhaust and starting air valves, separate actuating heads for each of the said valves, a longitudinally shiftable cam shaft having separate sets of cams thereon for actuating the heads at properly timed intervals for forward or reverse running, a rotatably mounted lay shaft, means operable by rotation of the lay shaft for actuating the heads together between neutral and operating positions, a revoluble control shaft, means operable in accordance with the direction of rotation of the control shaft for actuating the valve actuating heads and cam shaft into or from operative relation, a gear wheel fixed to the control shaft, a gear rack operating in mesh with said shaft gear, an air ram for actuating the rack to rotate the shaft and a cataract brake mechanism of the character described for controlling the direction and extent of movement of the gear rack, for the puspose set forth.

7. A valve controlling mechanism for the fore and aft cylinders of an internal combustion engine of the character described wherein each cylinder comprises fuel injection, air supply, exhaust and starting air valves, separate actuating heads for each of the said valves, longitudinally shiftable cam shafts having separate sets of cams thereon for actuating the heads at properly timed intervals for starting and driving the engine in a forward or reverse direction, rotatably mounted lay shafts for each cylinder, means operable by rotation of the lay shafts for moving the heads between neutral and operating positions, revoluble control shafts, means operable in accordance with the direction of rotation of the control shafts for moving the valve actuating heads of the separate cylinders and for shifting the separate cam shafts into or from operative position, gear wheels fixed to the control shafts, a gear rack operating in mesh with each of the said gear wheels, an air ram for actuating each of the racks, a control lever operatively connected through a cataract brake mechanism with each of the air rams and a pair of interlocking and cooperatively operating dogs operable by movement of either of said control levers in either direction to lock the opposite lever against movement in the opposite direction, for the purpose set forth.

8. In a valve controlled mechanism for engines comprising fore and aft cylinders, in combination, valve actuating mechanisms for different sets of cylinders, separate control shafts for the different actuating mechanisms; said control shafts being revoluble in opposite directions to effect forward and reverse running of the engine, operating levers fixed to the said control shafts and means operable by movement of either of said control levers in either direction for locking the other lever against movement in the opposite direction.

Signed at Tacoma, Pierce County, Washington, this 19th day of March, 1920.

ERNEST V. PARKER.